United States Patent [19]

Zdeb

[11] 4,126,081
[45] Nov. 21, 1978

[54] MACHINE SHIELD

[76] Inventor: Paul A. Zdeb, 4818 Bernice, Warren, Mich. 48091

[21] Appl. No.: 784,575

[22] Filed: Apr. 4, 1977

[51] Int. Cl.² .............................................. B23C 9/00
[52] U.S. Cl. ..................................... 90/11 R; 408/67
[58] Field of Search ............. 90/11 R; 408/67, 241 R, 408/710; 144/251 R, 251 A, 252 R; 83/397, 397.1, 478; 51/268, 272; 29/DIG. 56, DIG. 60, DIG. 86, DIG. 94

[56] References Cited

U.S. PATENT DOCUMENTS

| 1,783,478 | 12/1930 | Klugh et al. | 144/251 A |
| 2,368,109 | 1/1945 | Brown | 51/272 |
| 2,957,375 | 10/1960 | Howlett | 408/67 X |
| 3,568,567 | 3/1971 | Seck et al. | 51/268 X |

Primary Examiner—Horace M. Culver
Attorney, Agent, or Firm—Walter Potoroka, Sr.

[57] ABSTRACT

A safety shield for a machine tool, such as a Bridgeport vertical milling machine, having a rotatable spindle mounted in a non-rotating quill comprising a transparent main or anchor panel formed to receive and be attached to the quill in a manner so that the plane of the panel is transverse to the axis of the quill and at least one transparent movable panel pivotally connected to the anchor panel in a manner to permit pivotal movement of the movable panel outwardly away from a position approximately parallel to the spindle to a position above the plane of the anchor panel, whereby said shield is always positioned adjacent the spindle.

4 Claims, 10 Drawing Figures

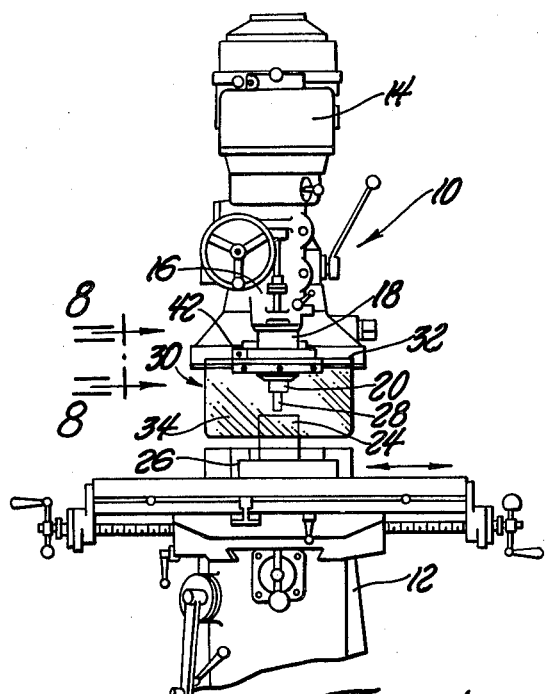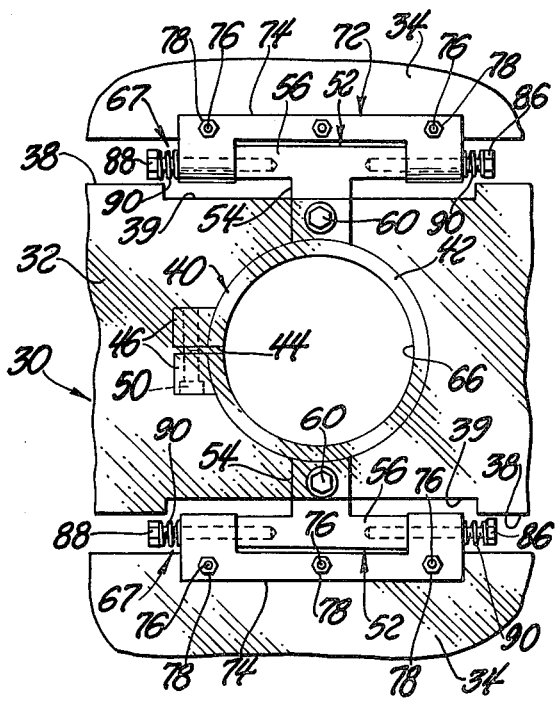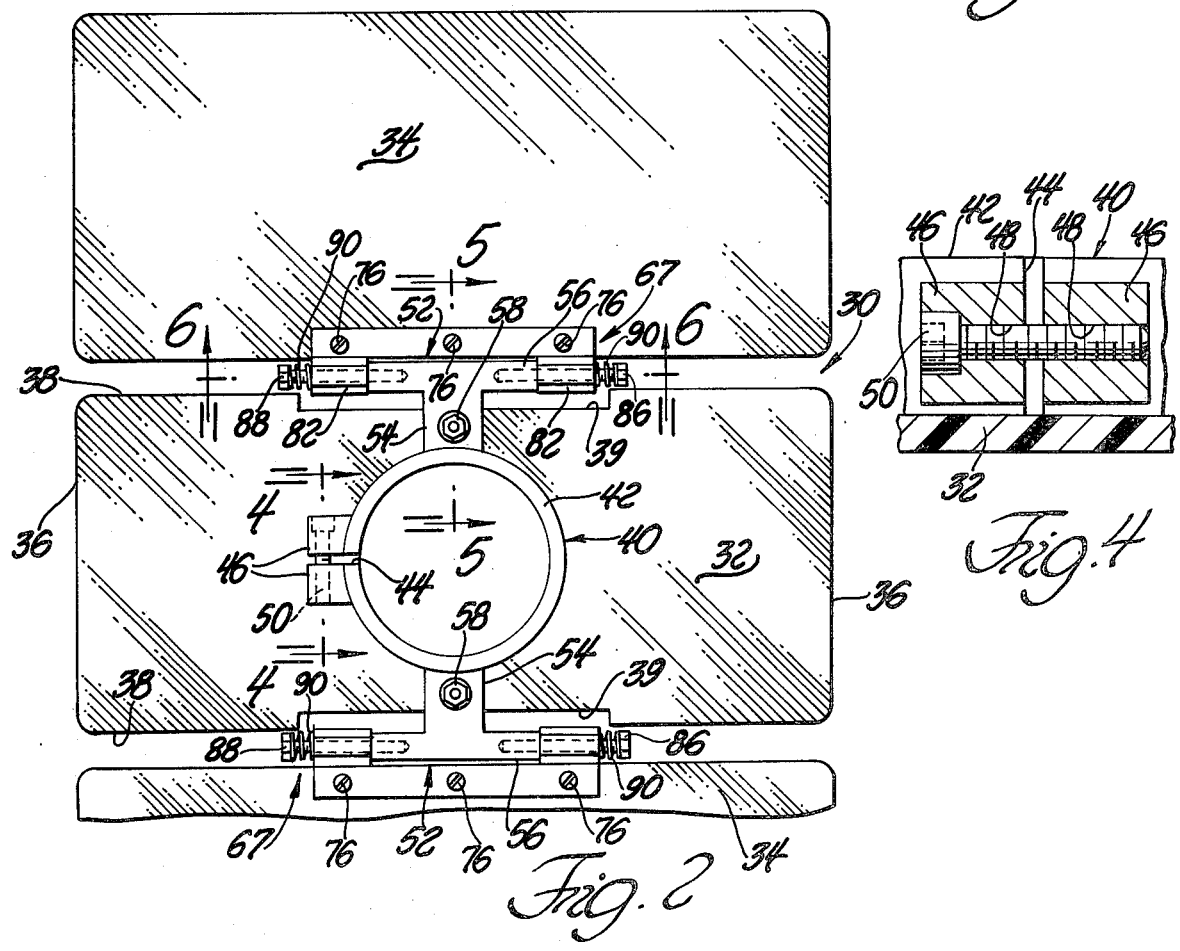

MACHINE SHIELD

BACKGROUND OF THE INVENTION

This invention relates to safety shields or guards for machines, and more particularly to a safety shield specially adapted for use with vertical milling machines such as the well-known Bridgeport type machines.

While machine guards of various designs have been in use for many years, their importance has been increased by relatively recent developments such as the Occupational Health and Safety Act of 1970, which requires, for example, that one or more methods of guarding machines be provided to protect persons in the area from hazards such as rotating parts, splashing coolants and flying chips, and that guards be affixed to the machine.

Further, in addition to OSHA requirements and a moral obligation to protect operators, adequate machine shields and guards are necessary for reasons such as controlling costs of industrial insurance, protecting against judicial awards for industrial accidents, etc.

A main object of this invention is to provide a shield or guard that is particularly adapted for use with a machine tool, such as a Bridgeport vertical milling machine, having a rotatable spindle mounted in a non-rotatable quill.

Another object of the invention is to provide such a shield that is adapted to be secured to the quill, so as to be movable with the quill and thus be always positioned adjacent the spindle tool from which chips may fly, and coolant liquid may splash.

Another object of the invention is to provide such a shield that is easily and quickly secured to, and removed from, the quill.

A still further object of the invention is to provide such a shield that comprises a transparent main anchor panel and at least one transparent movable panel hingedly secured to the anchor panel.

A further object of the invention is to provide such a shield, wherein said anchor panel is formed with an opening therein, preferably near the center thereof, to receive the spindle and quill.

Still another object of the invention is to provide such a shield having means adjacent the anchor panel opening for removably securing the shield to the quill, with the plane of the anchor panel disposed normal to the quill axis, at any desired position along the quill axis and in any desired rotational (horizontal) position with respect to the quill.

Another object is to provide such a shield, wherein the movable panel is pivotable outwardly from a position approximately parallel to the spindle axis to a position above the plane of the anchor panel.

A still further object of the invention is to provide such a shield, wherein the pivotal connection of the panels has sufficient friction so that the movable panel will remain in any position to which it is moved.

These and other objects and advantages of the invention will become readily apparent by reference to the attached specification and the accompanying drawings.

BRIEF DESCRIPTION OF THE VARIOUS VIEWS OF THE DRAWINGS

FIG. 1 is a fragmentary front elevational view of a Bridgeport type vertical milling machine having a shield embodying the invention attached thereto.

FIG. 2 is an enlarged top plan view, with a portion thereof cut away, of the shield shown in FIG. 1.

FIG. 3 is an enlarged fragmentary bottom plan view of the shield shown in FIG. 1.

Figure 5:
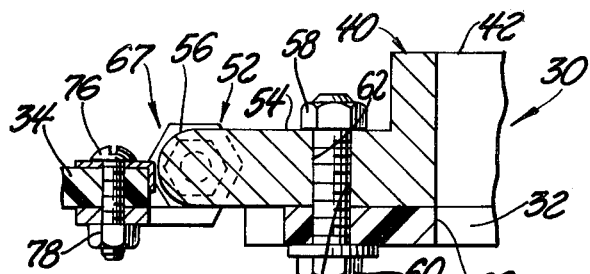
Figure 6:
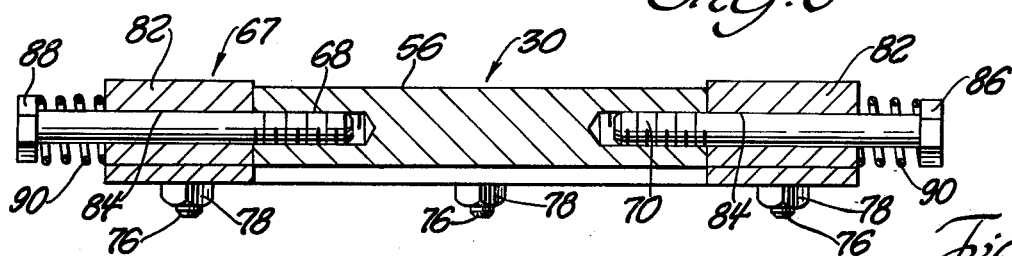

FIGS. 4, 5 and 6 are still further enlarged fragmentary cross-sectional views taken on the planes of lines 4—4, 5—5 and 6—6, respectively, of FIG. 2, and looking in the direction of the arrows.

Figure 7:
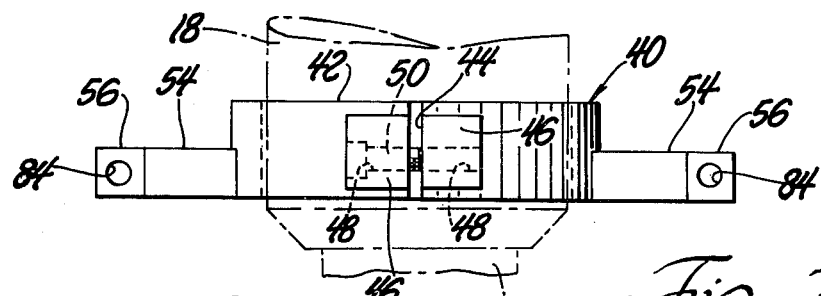

FIG. 7 is an enlarged fragmentary elevational view illustrating an element of the invention.

Figure 8:
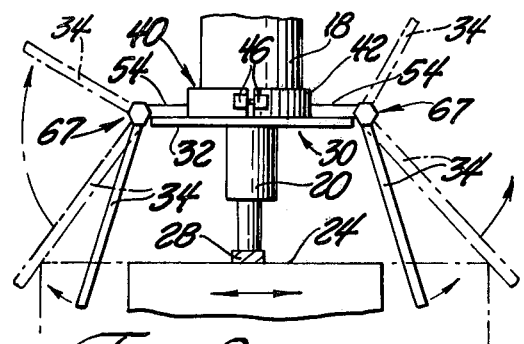

FIG. 8 is an enlarged fragmentary end elevational view taken on the plane of line 8—8 of FIG. 1, looking in the direction of the arrows.

Figure 10:
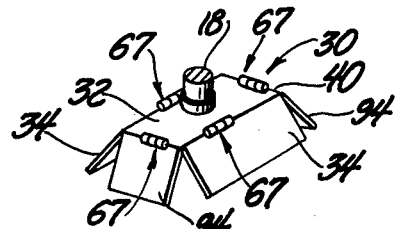
Figure 9:
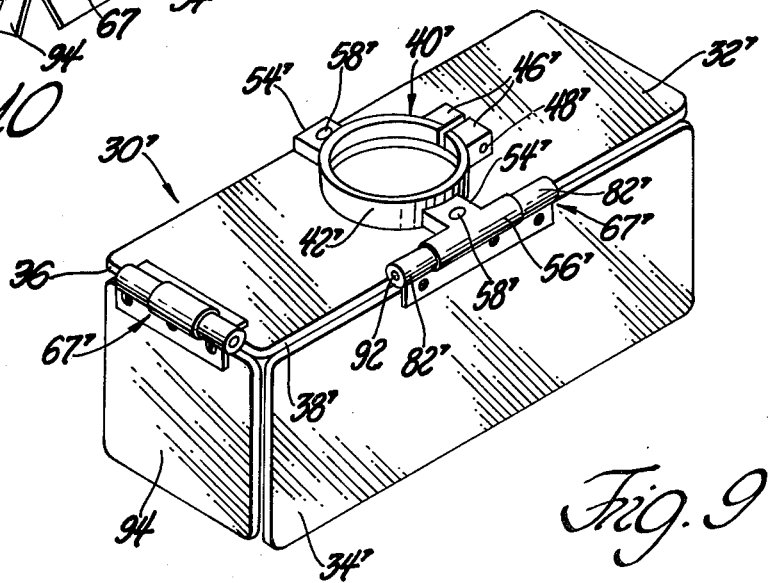

FIG. 9 is a perspective view of another embodiment of the invention;

FIG. 10 similarly illustrates a further embodiment.

DETAILED DESCRIPTION OF THE INVENTION

Referring to the drawings in greater detail, FIG. 1 illustrates a machine tool 10 such as the well-known Bridgeport vertical milling machine having a base 12, a drive motor 14, a turret 16, which includes a quill 18 and a spindle 20, and a table 22.

The table 22 is formed to provide means to hold the work 24 being machined, which may itself be held in place by suitable intermediate vise or other means 26, and it is movable vertically and in both directions horizontally (side-to-side and front-to-rear in FIG. 1), either manually or automatically under power, to move the work 24 into the cutting tool 28.

The motor 14 and turret 16 are normally connected and pivotable, as a unit, about horizontal axes, so that the tool 28 can be presented to the work 24 at various angles.

The above-mentioned machine structures and the means for manual or automatic power movement thereof are well known in the machine tool art. They are briefly described above only for purposes of general background, to facilitate description and understanding of the structure and function of the shield device 30 contemplated by the invention.

Whatever the other detailed machine structure may be, it will be understood that the quill 18 has a cylindrical outer shape and is adjustable axially in and out of the turret 16, but is not rotatable. The spindle 20, which is also adjustable axially within the quill, is adapted to hold and rotate the cutting tool 28.

Referring now to FIGS. 2-9, it will be noted that the shield device 30, as shown in the top plan view of FIG. 2, may comprise three aligned panels, which are referred to herein, for purposes of describing the invention, as a main or anchor panel 32 and movable panels 34, one of which is partially cut away in FIG. 2. As stated, the invention contemplates at least one movable panel 34, and the movable panel (or panels) 34 can be disposed adjacent the end (or ends) 36 of the anchor panel, as opposed to (or in addition to) being disposed adjacent the sides 38 of anchor panel 32. That is, a device 30 could have any combination of movable panels 34, such as four panels, one at each end 36 and side 38, or it could have only one movable panel, at one end 36 or one side 38, or, as shown in FIG. 9, one panel 34 at one end 36 and one panel 34 at one side 38, etc.

While the panels 32 and 34 can be made from any desired material, in the preferred embodiment of the invention, the panels are constructed in any desired manner from a transparent plastic type material, such as Plexiglas, to enable visual inspection of the work through the panels. Further, panels 32 and 34 can be made of any desired shape, size and thickness.

Referring again to FIGS. 1 and 7, it will be apparent that the device 30 can be made so that any particular device is especially adapted for use with a particular machine tool 10. That is, the device could be made in a variety of configurations and sizes to adapt the same for a variety of specific machine tools.

In the drawings, the device 30 is shown as adapted to be secured to the non-rotatable quill 20. For this purpose, the device 30 comprises a quick connect-quick disconnect securing or anchor member 40 that includes a ring element 42 that is split at 44 and has projections 46 adjacent the opening 44 formed with aligned threaded passages 48 to receive the securing screw 50. The internal diameter of the ring 42 is such that the ring 42 can quickly be securely fitted on the cylindrical quill 18 and clamped, in any desired vertical or horizontal position thereon, by tightening the screw. Removal from the quill is easily accomplished by loosening the screw 50.

Generally T-shaped members 52 extend from opposite sides of the ring, each member 52 comprising a diametric portion 54 and a portion 56 that is disposed normal to portion 54 so as to be disposed parallel to the side 38. It will be noted (see FIG. 5) that the sides of member 52 and ring 42 adjacent anchor panel 32 lie in the same plane and that anchor member 40 is secured to panel 32 by any suitable means, such as bolt/nut assemblies 58/60 received in aligned openings 62 and 64 formed in portion 54 and panel 32, respectively. An opening 66 having the same diameter as the internal diameter of ring 42 is formed in panel 32 to receive quill 18, with some clearance.

It will be seen that portion 56 is an element of a hinge means 67 by which each panel 34 may be pivotally connected to anchor panel 32, portion 56 having threaded passages 68 and 70 at the ends thereof. A hinge member 72 has the portion 74 thereof secured to the adjacent panel 34 by any suitable means such as the bolt/nut assemblies 76/78 passing, in a manner similar to the case of fasteners 58/60, through appropriate aligned openings formed in portion 74, panel 34 and a separate support element 80.

Hinge member 72 includes a portion 82 at each end thereof having a passage 84 therethrough aligned with one of the threaded passages 68 and 70 formed in the ends of portion 56. Bolt 86 extends through one passage 84 and is threaded into threads 70, and bolt 88 is likewise threaded into passage 68. Relatively stiff springs 90 provide sufficient hinge tension to cause the movable panel to remain in any position to which it is moved. While a spring 90 is shown at each end of the hinge, a spring at only one end may be adequate for the purpose.

In FIG. 8, the initial set positions of movable panels 34 are shown in solid lines, with the tool 28 and work 24 being shielded at the top and sides by the transparent panels 32 and 34 to protect an observer against flying chips and the like. It is to be noted that the hinges 66 may be formed so that panels 34 cannot be adjusted, in FIG. 8, so as to converge into the tool and work at their bottom edges. That is, due to interference with the adjacent side edge 38 of panel 32, which acts as a stop, even where clearance notch 39 in the edge 38 is provided, movable panels 34 can be moved only, outwardly and not inwardly, from their FIG. 8 solid line positions.

Referring again to FIG. 8, if the work 24 is moved right or left (forward or rearward in FIG. 1), as indicated by the arrows, sufficiently to contact one of the panels 34, that panel merely will be moved outwardly by the work, against the friction of springs 90, to a new (intermediate) broken line position, without interfering with the machining operation or materially adversely affecting the protection provided by the shield device.

As also shown by the broken lines, the panels 34 can be moved outwardly to the (upper) position above the plane of panel 32 to provide free and completely unencumbered (as if the shield were not present) access to the work, as in setting up the machine, etc., after which the panels 34 can be lowered again to any desired position, such as that shown in solid lines, for continued work.

FIG. 7 illustrates anchor member 40, stripped of the other elements of device 30, but with the quill shown in phantom lines, to show the relationship between the quill 18 (or any equivalent portion of any machine tool, such as a drill press) and the member 40 mounted thereon. As stated, member 40 is designed to fit portion 18, whatever its shape, and it could be part of the anchor panel.

FIG. 9 is a perspective view of a shield device 30', similar to device 30, except for the differences described, the similar elements being identified with the same reference numerals marked with the prime symbol "'".

As in the case of device 30, split anchor member 40' is formed with oppositely disposed portions 54', but only one of which is formed with hinge portion 56'. Member 40' is secured to anchor panel 32', as by bolts at 58', and projections 46' are adapted to receive a securing screw in threaded passage 48'.

One movable panel 34' is secured to the side 38' of panel 32' by a hinge, generally designated by 67', which includes, in addition to hinge portion 56', end portions 82' secured to movable panel 34'. For purposes of simplifying the description, the hinge 67' is shown as a pin 92 extending through portions 82' and 56'. It will be understood, however, that the hinge 67' of FIG. 9 may be similar or identical to hinges 67 to FIGS. 1–8, including bolts 88 and springs 90. Panel 34' is movable in the same manner as panels 34 in FIGS. 1–8.

Device 30' has a second movable panel 94 pivotally secured to the end 36 of anchor panel 32' by a hinge structure 67' similar to hinge 67 for movable panel 34'. The main difference between device 30' and device 30 is that device 30 has no end panels 94, while device 30' has at least one end panel. Actually, since the anchor panels 32 and 32' can be of any desired size and shape, the main difference is that device 30' has movable panels 34' and 94 at adjacent sides of the anchor panel 34'.

The facts that (a) the device 30 can be secured by anchor means 40 in any rotational (horizontally) or axial (vertical) position on the quill, (b) the anchor panel 32 can be of any desired shape and (c) the movable panels can be secured at any side (as in FIGS. 1–8 and 9) or all sides (as in FIG. 10) of the anchor panel 32 enables the device 30 to provide adaptability to a wide variety of situations in shielding for machine tools such as vertical milling machines or drill presses.

It will be further understood that the anchor member 40 can be of any material, size and configuration required to secure the same to the non-rotating machine element in which the rotatable spindle is mounted. For example, the ring 42 could be formed as part of panel 32.

Whatever the variable specific details of construction might be, main features of a shield device embodying the invention are an anchor panel having an opening therein to receive the quill, with means adjacent the opening for removably securing the anchor panel to the quill, and at least one movable panel hingedly connected to the anchor panel in a manner so that the movable panel will remain in the position to which it is moved. For certain applications, the anchor panel 32 could be also an anchor means 40, with means for attaching one or more movable panel 34. Preferably the movable panel (or panels) can be moved outwardly and upwardly from a position approximately parallel to the spindle axis (normal to the plane of the anchor panel) to a position above the plane of the anchor panel, as shown in FIG. 8, to provide free and unobstructed access to the work and the tool.

It will be apparent that the shield device shown and described fulfills the objects referred to above. Further, since the device comprises pivotable transparent shield panels that remain adjacent the tool and surround the work being machined, it provides the following advantages:

1. Prevents accidents and lost man hours.
2. Provides maximum protection to eyes, face and other exposed portions of the body from flying chips and splashing coolants.
3. Reduces housekeeping by intercepting chips and coolant close to the work.
4. Provides greater coolant recovery.
5. Permits close examination of work without danger of injury.
6. Permits quick and easy attachment to and removal from the machine tool.
7. Adaptability to be secured at various positions with respect to the quill (horizontally and vertically) provides maximum flexibility in direction and level of shielding.
8. Pivotability of movable panel permits adjustment to eliminate light glare from panel.
9. Pivotability of the movable panels outwardly and upwardly toward a position above the plane of the anchor panel provides unobstructed access to the tool and work, as if there were no shield.
10. Pivotability of movable panels enables panels to be moved out of the way by the work without harm to the panels.

The invention has been shown and described in such clear and concise terms as to enable anyone skilled in the art to practice the same.

While a preferred embodiment, with modifications, has been described, other modifications are possible, and no limitations are intended except as recited in the appended claims.

What I claim as my invention is:

1. A safety shield specially adapted for use with machine tools having a spindle rotatable about a normally vertical axis, and particularly of the milling machine type having a non-rotatable element, such as an extendible quill, and a tool-driving spindle rotatably mounted coaxially within the quill so as to be extendible toward the work, said shield comprising a plurality of flat transparent shield panels, said panels including an anchor panel and at least one movable panel, said anchor panel having an opening therein to receive the non-rotatable element and means for securing said anchor panel to the non-rotatable element, and hinge means securing each movable panel to said anchor panel; whereby each of said movable panels is pivotally secured to said anchor panel, said anchor panel securing means comprising a collar secured to said anchor panel at the opening therein so as to receive the non-rotatable element, each of said movable panels being secured along one edge to an edge of said anchor panel, said collar having at least one hinge member connected to and extending laterally therefrom to the edge of said anchor panel to which one of said movable panels is secured, said movable panel having a cooperating hinge member secured to the edge thereof, thread means formed on one of said hinge members, said hinge means including, in addition to said hinge members, at least one hinge pin and spring means, said pin having thread means adapted to cooperate with said thread means formed on one of said hinge members to compress said spring means and place a frictional load on said hinge means, whereby said hinge means retains said movable panel in any position to which it is moved.

2. A shield such as that recited in claim 1, wherein said hinge member having means for securing said collar to said anchor panel.

3. A shield such as that recited in claim 1, wherein said hinge means is constructed with stop means so that said movable panel member can be moved outwardly away from the spindle but cannot be moved toward the spindle beyond a position substantially parallel to the spindle axis.

4. A safety shield for a machine tool having a vertical quill with a tool spindle therein rotatable about a vertical axis, said anchor panel having means to attach the same to the quill in a horizontal position transverse to the spindle axis, said anchor panel having straight edge portions and an opening at or near the center thereof to receive said quill, said attaching means comprising a collar secured to the top of said anchor panel with means for securing said collar to the quill, at least one first hinge element means integral with said collar extending to at least one edge of said anchor panel, at least one substantially flat unbreakable transparent movable panel positioned to have one edge thereof disposed adjacent said one edge of said anchor panel, said panels being impervious to fluids and transparent out to the edges thereof and free of opaque peripheral framing whereby maximum visibility is provided to the tool through said shield, second hinge element means cooperating with said first hinge element means secured to said adjacent edge of said movable panel, one of said hinge elements having thread or other adjustable securing means formed thereon, hinge pin means having an adjustable securing means cooperating with said hinge element adjustable securing means, and spring tension means disposed in a manner so that said adjustable securing means can be adjusted to spring load said hinge elements, whereby said hinged movable panel will remain in any position to which it is moved, said hinge connection of said movable panel to said anchor panel having stop means such that said movable panel cannot be rotated downwardly about said hinge pin toward the spindle beyond a position substantially parallel to said spindle axis but such that said movable panel can be rotated outwardly and upwardly to a position above the plane of said anchor panel.

* * * * *